J. DAIN & H. B. SPERRY.
HAY PRESS.
APPLICATION FILED JULY 8, 1910.
1,090,137.
Patented Mar. 17, 1914.
3 SHEETS—SHEET 2.
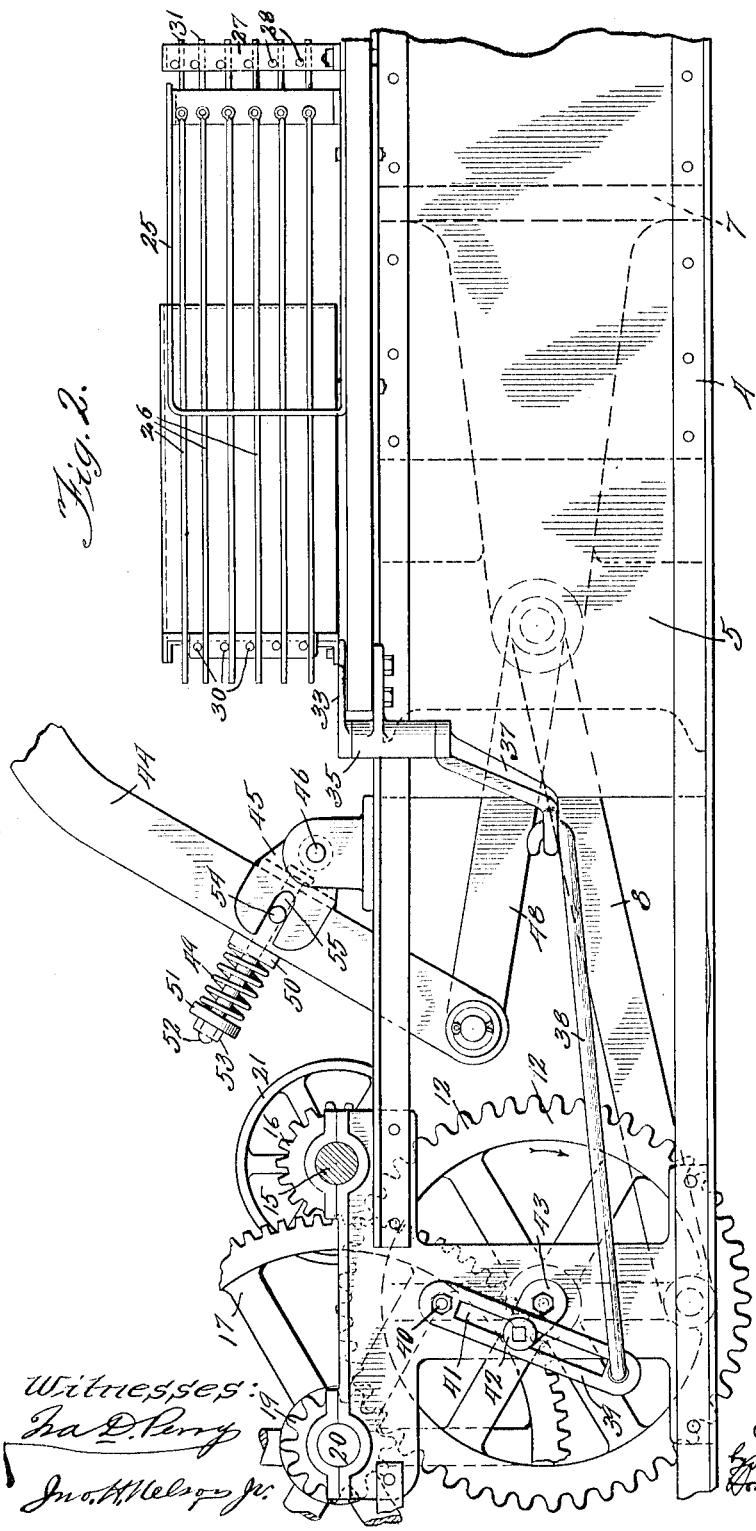

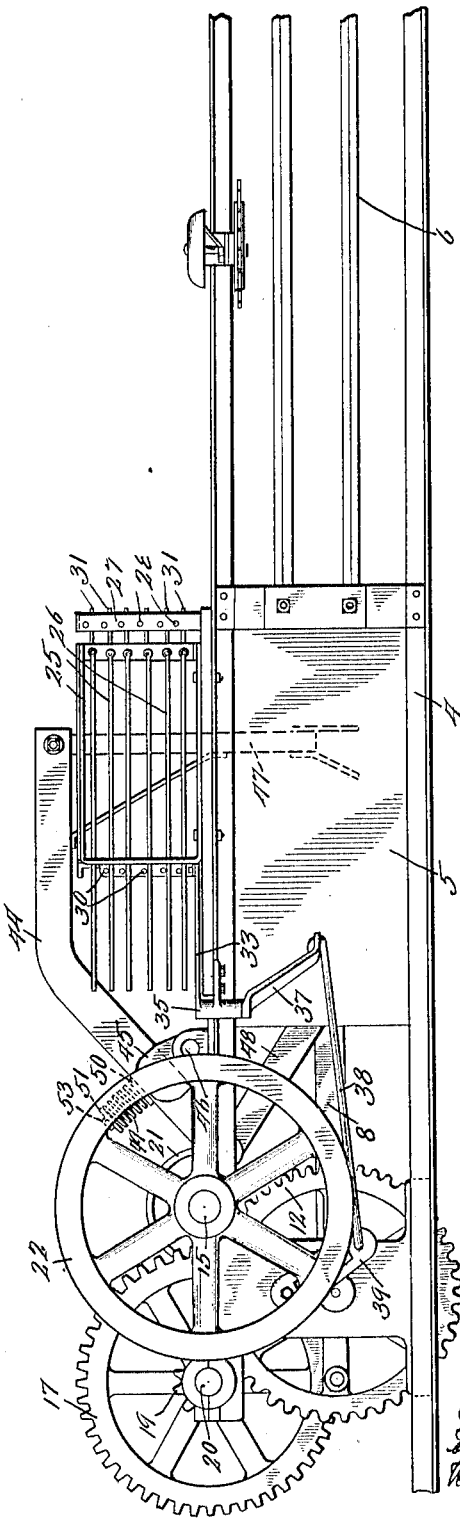

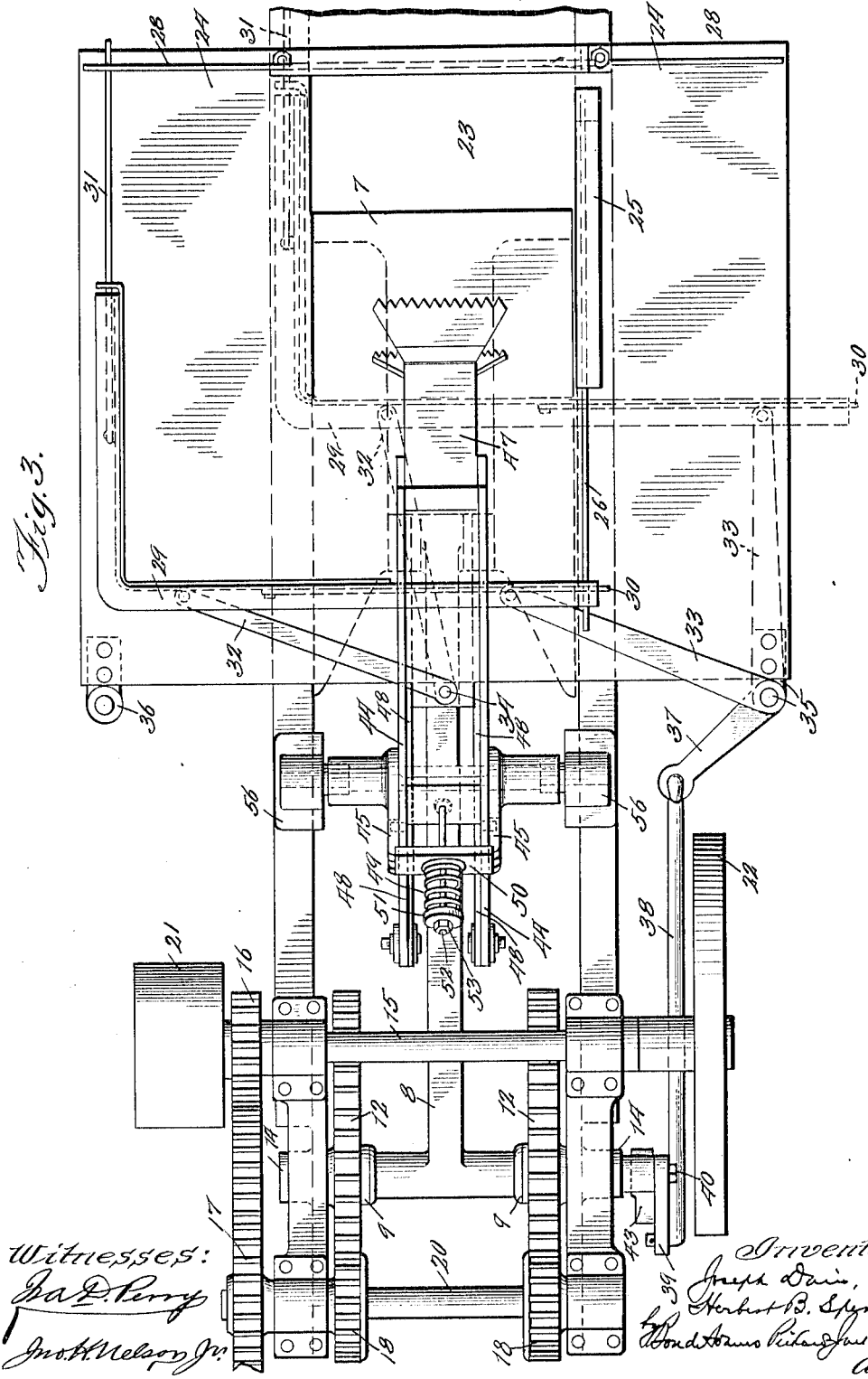

UNITED STATES PATENT OFFICE.

JOSEPH DAIN AND HERBERT B. SPERRY, OF OTTUMWA, IOWA, ASSIGNORS TO DAIN MANUFACTURING COMPANY OF IOWA, OF OTTUMWA, IOWA, A CORPORATION OF IOWA.

HAY-PRESS.

1,090,137.   Specification of Letters Patent.   Patented Mar. 17, 1914.

Application filed July 8, 1910. Serial No. 571,001.

*To all whom it may concern:*

Be it known that we, JOSEPH DAIN and HERBERT B. SPERRY, citizens of the United States, residing at Ottumwa, in the county of Wapello and State of Iowa, have invented certain new and useful Improvements in Hay-Presses, of which the following is a specification, reference being had to the accompanying drawings.

Our invention relates to hay presses, and has for its object to provide certain improvements therein, such improvements having to do more particularly with the mechanism for supplying the hay to the baling chamber.

To this end our invention consists in providing improved means for condensing the hay before its introduction into the compression chamber and in providing an improved construction of feeder for carrying the hay down into the compression chamber, which is so constructed as to yield in case the feeder or beater head encounters an unyielding obstacle, thereby preventing breakage.

We accomplish the objects of our invention as illustrated in the drawings and as hereinafter described.

What we regard as new is set forth in the claims.

In the drawings,—Figure 1 is a side elevation of the principal parts of a hay press embodying our invention; Fig. 2 is an enlarged side view, the fly-wheel being removed; and Fig. 3 is a plan view of the parts shown in Fig. 2.

Referring to the drawings,—4 indicates the frame of the press, which is provided, as shown, with a compression chamber 5 and an extension 6 in which the several charges are pressed together in forming the bale.

7 indicates a plunger, which reciprocates in the compression chamber in the usual way and is driven by a pitman 8 which is connected by wrist-pins 9 with gears 12, mounted on studs 14 at opposite sides of the frame, as shown in Fig. 3. The gears 12 are driven from a drive-shaft 15 through intermediate gears 16, 17 and 18, the gears 17—18 being mounted on a countershaft 20 arranged parallel with the drive-shaft 15. 21 indicates a belt-pulley mounted on the drive-shaft 15, by which it may be driven from any suitable source of power.

22 indicates a fly-wheel preferably mounted on the opposite end of the shaft 15.

Obviously, by the rotation of the gears 12 the plunger 7 may be reciprocated in the compression chamber.

23 indicates the usual opening leading into the compression chamber, which opening is surrounded on three sides by a feeding table 24.

25 indicates an open frame, of angle-iron or other suitable material, which is secured adjacent to one of the side edges of the opening 23, rising vertically at such side edge, as shown in Figs. 1 and 3. Said frame is substantially of the same length as the feeding opening 23 and is provided with a number of rods 26 arranged horizontally and extending forward beyond the end thereof— *i. e.*, toward the drive-shaft 15—in the manner shown in Fig. 1. As best shown in said figure, the several rods 26 are parallel and their forward or outer ends extend a considerable distance beyond the frame 25.

27 indicates a second frame, similar to the frame 25, which extends across the rear edge of the feeding opening 23 adjacent to the frame 25, standing at right angles to said frame 25, as shown in Fig. 3. The frame 27 is also provided with a series of rods or bars 28 similar to the rods 26 with the exception that the rods 28, for the purpose of facilitating the reversal of the condensing apparatus as hereinafter referred to, extend equally from each side of the frame 27, in the manner shown in Fig. 3. Both the frames 25 and 27 are stationary and with their respective rods 26 28 act as barriers or guards to keep the hay thrown over the feeding opening in place when it is condensed, as hereinafter described.

29 indicates an angular frame, which is provided with projecting rods or bars 30 31 at its ends, said rods interlacing with the rods 26 28, respectively, in the manner shown in Fig. 3, thus forming a rectangular inclosure which, when extended to its greatest size, comprehends the feeding opening 23 and a considerable part of the feeding table 24. The illustration in Fig. 3 shows this inclosure extended to its greatest capacity. The frame 29 is capable of being moved diagonally toward the feeding opening into the position shown in dotted lines in Fig. 3, at which time it registers substantially with two of the side edges of the feeding opening, the rods 30 31 then extending a considerable distance beyond the rods 26 28, respectively. By moving the frame 29 up toward the feeding opening in this manner, it will be apparent that the hay resting on the feeding table and over the feeding opening will be condensed so that it will more readily pass through the feeding opening, thus relieving the operator of the necessity of manually condensing the hay in order that the automatic feeding device will carry it all into the compression chamber.

In order to automatically operate the frame 29, it is mounted on parallel bars 32 33, respectively, carried on vertical shafts 34 35, respectively, suitably journaled at the forward side edge of the table 24, as shown in the drawings. The shaft 34 is at the transverse center of the table, the shaft 35 being at one of the side edges thereof. A supplemental bearing 36 is preferably provided at the opposite side edge of the table to permit of the reversal of the position of the frame 29 so that it may be used at the other side of the machine. By this construction the swinging of the bars 32 33 will move the frame 29 diagonally toward and away from the feeding opening 23, holding it at all times parallel with the side and rear margins thereof.

37 indicates a crank carried by the shaft 35 and connected by a connecting rod 38 with a slotted arm 39, which is connected by a pivot 40 at one end with the frame of the press, as shown in Fig. 2. The arm 39 is provided with a slot 41 which receives the wrist-pin 42 of a crank 43 extending through the stud 14 and connected to gear 12, said wrist-pin being arranged to slide in said slot as the gear 12 rotates. Said gear is arranged to rotate in the direction indicated by the arrow in Fig. 2. By this construction the rotation of the gear 12 will swing the arm 39 slowly to the left, but will return it quickly, as on the return movement the wrist-pin 42 will be nearer the pivot 40. When the arm 39 is swung to the right, the crank 37 will be carried in the same direction, thereby rocking the parallel bars 32 33 to the right and moving the frame 29 up toward the feeding opening. Thus the frame 29 will be automatically operated to condense the hay and permit of its being carried more readily into the compression chamber.

In order to automatically force the hay down through the feeding opening, we provide a feeding device comprising beater-arms 44 which are fulcrumed intermediately upon a casting 45 mounted to rock about trunnions which project inwardly from blocks 56 placed at the top of the frame of the press, as shown in Fig. 3. At their outer ends the beater-arms 44 carry a beater-head 47 and at their inner ends they are connected by pitmen 48 with the rear end of the plunger 7, the arrangement being such that as the plunger advances into the compression chamber the beater-head is swung up out of operative position, and when the plunger is withdrawn said beater-arm is carried down into the compression chamber. In order to permit the beater-head to yield if it encounters a fixed obstruction, the beater-arms 44 are not fixedly connected with the casting 45 but rest thereon and are normally held in operative position by a spring 49, the lower end of which bears against a plate 50 which rests upon the beater-arms 44, its outer end bearing against a washer 51 carried by a pin 52 and held in place by a nut 53. The pin 52 is secured at its inner end to the casting 45, as shown in Fig. 2. By this construction, when the beater-head encounters extraordinary resistance the spring 49 permits it to yield, thereby avoiding breakage. In order to prevent endwise movement of the beater-arms relatively to the casting 45, said arms are provided with laterally-projecting pins 54 which fit in slots 55 in the sides of the casting or yoke 45, as shown in Fig. 2. By adjusting the nut 53, the tension of the spring 49 may be regulated. We thus provide a very compact and simple construction for yieldingly supporting the beater-arm and one in which there is no end thrust on the beater-arm when it leaves its seat in the yoke or casting. Furthermore, we also provide a simple and economical construction for feeding the hay and one by which the hay is maintained in rectangular form at all times during the condensing operation and consequently is condensed more uniformly, thus facilitating the feeding of the hay into the compression chamber and insuring uniformity through the compacted sections of the bale.

That which we claim as our invention, and desire to secure by Letters Patent, is,—

1. In a hay-press, the combination of a compression chamber having a feeding opening, a plunger, means for actuating the plunger, a feed-table adjacent to the feeding opening, condensing mechanism surrounding the feeding opening, said condensing mechanism comprising a rectangular frame composed of a plurality of members, certain of said members being movable from different directions toward the feeding opening, and means for actuating the condensing mechanism.

2. In a hay-press, the combination of a compression chamber having a feeding opening, a plunger, means for actuating the plunger, a feed-table adjacent to the feeding opening, condensing mechanism surrounding the feeding opening, said condensing mechanism comprising a rectangular frame composed of a plurality of members, certain of said members being movable toward the feeding opening, means for maintaining the angular relation of the latter member or members to the feeding opening during the movement thereof, and means for actuating the condensing mechanism slowly on the condensing stroke thereof and quickly on the return stroke thereof.

3. A condensing apparatus for hay presses, comprising a stationary frame adjacent to two adjoining edges of the feeding opening and a movable frame arranged parallel with the other edges of the feeding opening and movable toward and away therefrom, and means for actuating said movable frame.

4. A condensing apparatus for hay presses, comprising a stationary frame adjacent to two adjoining edges of the feeding opening and a movable angular frame arranged parallel with the other edges of the feeding opening and movable toward and away therefrom, and means for actuating said movable frame.

5. A condensing apparatus for hay presses, comprising a stationary frame adjacent to two adjoining edges of the feeding opening and a movable frame arranged parallel with the other edges of the feeding opening and movable toward and away therefrom, the members of said movable frame being interlaced with the members of the stationary frame, and means for actuating said movable frame.

6. A condensing apparatus for hay presses, comprising a rectangular frame surrounding the feeding opening and expansible in two directions, said frame comprising interlaced movable and stationary members arranged in parallelism with the edges of the feeding opening, and means for actuating the moving portion of said frame to move it toward and from the feeding opening.

7. A condensing apparatus for hay presses, comprising a rectangular expansible frame surrounding the feeding opening, said frame comprising interlaced movable and stationary members arranged in parallelism with the edges of the feeding opening, and means for actuating the moving portion of said frame to move it toward and from the feeding opening, said actuating means being arranged to move the movable portion of said frame slowly toward the feeding opening and quickly away therefrom.

8. A hay-press comprising a baling chamber having a feeding opening, angular condensing means adjacent to said opening and movable diagonally toward the feeding opening to condense the hay, and means for actuating said condensing means.

9. A hay-press, comprising a baling chamber having a feeding opening, angular condensing means adjacent to said opening and movable diagonally toward the feeding opening to condense the hay, and means for actuating said condensing means slowly on the condensing stroke thereof and quickly on the return stroke thereof.

10. A hay-press comprising a baling chamber having a rectangular feeding opening, a plunger operating in the baling chamber, condensing means adapted to operate at two adjoining sides of said feeding opening and movable bodily toward and from the same, and means for actuating said condensing means.

11. A hay-press, comprising a baling chamber having a rectangular feeding opening condensing means adapted to operate at two sides of said feeding opening and movable bodily diagonally toward and from the same, and means for actuating said condensing means.

JOSEPH DAIN.
HERBERT B. SPERRY.

Witnesses:
Joseph H. Browning,
W. G. Duffield.

---

Copies of this patent may be obtained for five cents each, by addressing the "Commissioner of Patents, Washington, D. C."